(12) United States Patent
von Carolsfeld et al.

(10) Patent No.: US 7,249,265 B2
(45) Date of Patent: Jul. 24, 2007

(54) MULTI-FEATURED POWER METER WITH FEATURE KEY

(75) Inventors: Rudolf Schnorr von Carolsfeld, Victoria (CA); Peter C. Cowan, Victoria (CA); Geoffrey T. Hyatt, Victoria (CA); Rene T. Jonker, Victoria (CA); Simon H. Lightbody, Victoria (CA)

(73) Assignee: Power Measurement, Ltd., Saanichton, British Columbia ( * ) Notice: Subject to any disclaimer, the term of this patent is extended or adjusted under 35 U.S.C. 154(b) by 849 days.

(21) Appl. No.: 09/791,421

(22) Filed: Feb. 23, 2001

(65) Prior Publication Data

US 2003/0110380 A1 Jun. 12, 2003

(51) Int. Cl.
*G06F 11/30* (2006.01)
*G06F 12/14* (2006.01)
*H04L 9/32* (2006.01)

(52) U.S. Cl. ...................................... 713/193; 713/340
(58) Field of Classification Search ................. 713/340
See application file for complete search history.

(56) References Cited

U.S. PATENT DOCUMENTS

| | | | |
|---|---|---|---|
| 4,225,839 A | 9/1980 | Martincic | |
| 4,900,275 A | 2/1990 | Fasano | |
| 4,957,876 A | 9/1990 | Shibata et al. | |
| 5,001,420 A | 3/1991 | Germer et al. | |
| 5,056,214 A | 10/1991 | Holt | |
| 5,192,227 A | 3/1993 | Bales | |
| 5,248,967 A | 9/1993 | Daneshfar | |
| 5,301,122 A | 4/1994 | Halpern | |
| 5,418,752 A | 5/1995 | Harari et al. | |
| 5,418,837 A | 5/1995 | Johansson et al. | |
| 5,548,527 A | 8/1996 | Hemminger et al. | |
| 5,554,312 A | 9/1996 | Hasbun et al. | |
| 5,555,508 A | 9/1996 | Munday et al. | |
| 5,568,398 A * | 10/1996 | Trainor ....................... 700/298 |
| 5,602,363 A | 2/1997 | Von Arx | |
| 5,627,759 A * | 5/1997 | Bearden et al. ............... 702/62 |
| 5,654,081 A | 8/1997 | Todd | |
| 5,664,202 A * | 9/1997 | Chen et al. .................. 713/340 |
| 5,680,324 A | 10/1997 | Schweitzer et al. | |

(Continued)

FOREIGN PATENT DOCUMENTS

CA 2299002 2/2000

(Continued)

OTHER PUBLICATIONS

Quick Facts Sheet, "6200 ION Compact Modular Power & Energy Meter", Power Measurement, Dec. 2000, 1 page.

(Continued)

*Primary Examiner*—Emmanuel L. Moise
*Assistant Examiner*—Nadia Khoshnoodi
(74) *Attorney, Agent, or Firm*—Brinks Hofer Gilson & Lione (57) ABSTRACT

An intelligent electronic device ("IED") includes at least one function module that performs a specified function or feature. The function module operates to perform a power management function in conjunction with IED. The IED operates with a one key code corresponding to the power management function. The key code operates to enable or disable the power management function.

49 Claims, 9 Drawing Sheets

U.S. PATENT DOCUMENTS

| | | | |
|---|---|---|---|
| 5,694,607 A * | 12/1997 | Dunstan et al. | 713/340 |
| 5,704,805 A | 1/1998 | Douty et al. | |
| 5,736,847 A | 4/1998 | Van Doorn et al. | |
| 5,745,044 A * | 4/1998 | Hyatt et al. | 340/5.23 |
| 5,767,790 A | 6/1998 | Jovellana | |
| 5,880,927 A | 3/1999 | Kent et al. | |
| 5,896,393 A | 4/1999 | Yard et al. | |
| 5,907,476 A | 5/1999 | Davidsz | |
| 5,933,004 A | 8/1999 | Jackson et al. | |
| 5,936,971 A | 8/1999 | Harari et al. | |
| 5,964,879 A * | 10/1999 | Dunstan et al. | 713/340 |
| 5,994,892 A | 11/1999 | Turino et al. | |
| 6,000,034 A * | 12/1999 | Lightbody et al. | 713/202 |
| 6,008,711 A | 12/1999 | Bolam | |
| 6,059,129 A | 5/2000 | Bechaz et al. | |
| 6,064,192 A | 5/2000 | Redmyer | |
| 6,185,508 B1 | 2/2001 | Van Doorn et al. | |
| 6,212,278 B1 | 4/2001 | Bacon et al. | |
| 6,219,656 B1 | 4/2001 | Cain et al. | |
| 6,262,672 B1 | 7/2001 | Brooksby et al. | |
| 6,275,168 B1 | 8/2001 | Slater et al. | |
| 6,301,527 B1 * | 10/2001 | Butland et al. | 700/286 |
| 6,367,023 B2 * | 4/2002 | Kling et al. | 713/340 |
| 6,380,949 B2 | 4/2002 | Thomas et al. | |
| 6,397,155 B1 | 5/2002 | Przydatek et al. | |
| 6,401,054 B1 | 6/2002 | Andersen | |
| 6,459,175 B1 | 10/2002 | Potega | |
| 6,459,997 B1 | 10/2002 | Andersen | |
| 6,486,652 B1 | 11/2002 | Ouellette et al. | |
| 6,493,644 B1 | 12/2002 | Jonker et al. | |
| 6,496,342 B1 | 12/2002 | Horvath et al. | |
| 6,553,336 B1 * | 4/2003 | Johnson et al. | 702/188 |
| 6,564,332 B1 * | 5/2003 | Nguyen et al. | 713/340 |
| 6,587,873 B1 | 7/2003 | Nobakht et al. | |
| 2003/0204756 A1 * | 10/2003 | Ransom et al. | 713/300 |

FOREIGN PATENT DOCUMENTS

| | | |
|---|---|---|
| WO | WO 01/01079 A1 | 1/2001 |
| WO | WO 01/01154 A1 | 1/2001 |
| WO | WO 01/01155 A1 | 1/2001 |
| WO | WO 01/01156 A1 | 1/2001 |
| WO | WO 01/01157 A1 | 1/2001 |
| WO | WO 01/01159 A1 | 1/2001 |
| WO | WO 01/01160 A1 | 1/2001 |
| WO | WO 01/55733 A1 | 8/2001 |

OTHER PUBLICATIONS

Brochure, "The First True Breakthrough In Solid-State Residential Metering", CENTRON®, 1998, 4 pages.

Manual, "3300 ACM, Economical Digital Power Meter/Transducer—Installation and Operation Manual, Power Measurement, Ltd.", 1999, 79 pages.

Brochure, SENTINEL™ Electronic "Multimeasurement Meter," Schlumberger, Mar. 2001, 4 pages.

*System Manager Software Setup Guide*, Version 3.1, p. 37, 1999.

*POWERLOGIC System Manager™ 3000 Software Family*, Square D Schneider Electric, Bulletin No. 3080HO9601T10/98, Oct. 1999.

*7700 Ion 3-Phase Power Meter, Analyzer and Controller*, pp. 1-8, Nov. 30, 2000.

*7700 ION® User's Guide*, Version 2.0, Appendix pp. A1-A8, Filed as early as Sep. 21, 1998.

*7700 ION® Revenue Meter Programming Key*, pp. 1-4, Aug. 6, 1997.

6200 ION, Installation & Basic Setup Instructions, © Power Measurement Ltd., Revision Date Apr. 25, 2001, 50 pages.

Sezi et al., "New Intelligent Electronic Devices Change the Structure of Power Distribution Systems", Oct. 1999, Industry Applications Conference, 1999. Thirty-Fourth IAS Annual Meeting. Conference Record of the 1999 IEEE, vol. 2, pp. 944-952.

Lohmann et al., "Enhanced Customer Value Enabled by Syergies Between Protection and Control in High Voltage Substations", Apr. 1996, Power System Contol Management, Fourth International Conference on (Conf. Publ. No. 421), pp. 98-102.

Swartz, "Interoperability of Intelligent Electronic Devices in a Substation", Apr. 1996, Power System Control and Management, Fourth International Conference on (Conf. Publ. No. 421), pp. 187-190.

Burger, "The Utility for Interoperability Between Intelligent Electronic Devices in the Substation-Goals and Status", Jul. 1999, Power Engineering Society Summer Meeting, 1999. IEEE, vol. 1, pp. 28-30.

DSP56F801/803/805/807 16-Bit Digital Signal Processor User's Manual Preliminary—Rev. 3.0, © Motorola, Inc, 2001, 782 pages.

1991, Robert Bosch, "CAN Specification Version 2.0", 68 pages.

A. Lakshmikanth and Medhar M. Morcos, Article "*A Power Quality Monitoring System: A Case Study in DSP-Based Solutions for Power Electronics,*" IEEE Transactions on Instrumentation and Measurement vol. 50. No. 3 Jun. 2001, 8 pages.

Niall Murphy article, Internet Appliance Design "*Forget Me Not*", Embedded Systems Programming Jun. 2001, 4 pages.

ION® Technology, Meter Shop User's Guide, © Power Measurement Ltd., Revision Date May 10, 2001, 48 pages.

Electro Industries/Gauge Tech DM Series—specification brochure, "DMMS 425 *Low-Cost Multifunction Power Monitoring Outperforms All Others in its Class*", 4 pages, publication date unknown.

Motorola™ Preliminary Information Application Brief "*Electronic Energy Meter with Powerline Modem on DSP56F80x*", DigitalDNA from Motorola, © 2000 Motorola, Inc., 2 pages.

PM130 Serials TrueMeter™ —The Low Cost Analog Replacement, specifications, Satec, Inc., 2 pages, publication date unknown.

* cited by examiner

MULTI-FEATURED POWER METER WITH FEATURE KEY

RELATED APPLICATIONS

The following co-pending and commonly assigned U.S. Patent Applications have been filed on the same date as the present application. This application relates to and further describes other aspects of the embodiments disclosed in the present application and is herein incorporated by reference.

U.S. patent application Ser. No. 09/791,419, "ASSEMBLY OF A COMPACT POWER DEVICE", filed concurrently herewith; now Abandoned;

U.S. patent application Ser. No. 09/791,420, "APPARATUS FOR MOUNTING A DEVICE ON A MOUNTING SURFACE", filed concurrently herewith, now U.S. Pat. No. 6,563,697; and U.S. patent application Ser. No. 09/792,701, "SYSTEM FOR IN THE FIELD CONFIGURATION OF INTELLIGENT ELECTRONIC DEVICES", filed concurrently herewith, now U.S. Pat. No. 7,085,824.

BACKGROUND

The present invention generally relates to Intelligent Electronic Devices ("IED's") and more specifically, to the design and manufacture of an electric meter. In a typical electrical distribution system, electrical energy is generated by an electrical supplier or utility company and distributed to consumers via a power distribution network. The power distribution network is the network of electrical distribution wires which link the electrical supplier to its consumers. Typically, electricity from a utility is fed from a primary substation over a distribution cable to several local substations. At the substations, the supply is transformed by distribution transformers from a relatively high voltage on the distributor cable to a lower voltage at which it is supplied to the end customer. From the substations, the power is provided to industrial users over a distributed power network that supplies power to various loads. Such loads may include, for example, various power machines.

At the customer's facility, there will typically be an electrical measurement meter connected between the customer and the power distribution network so as to measure the customer's electrical demand and usage. The meter accurately measures the amount of electrical energy flowing to the customer from the supplier or from the customer to the supplier. The amount of electrical energy measured by the meter is then used to determine the amount for which the energy supplier should be compensated.

Manufacturing multiple devices with only slight hardware or software differences can increase overall production cost, order management costs and inventory costs. Further, stocking or storing multiple device types with similar but not identical functionality can cause capital to be tied up at the consumer or retail level. Further, upgrading devices to add increased functionality can become cumbersome as the device must physically be removed and replaced.

A further disadvantage of some existing devices is that consumers may be required to upgrade their electrical measurement systems to meet expanded electricity utilization requirements, more stringent electrical reporting needs or simply a change in business focus. Presently, customers are faced with two alternatives. Firstly, they can expend the additional capital on devices more advanced than current needs dictate in anticipation of their future requirements. Secondly, they can purchase a device which meets present requirements but which will necessitate the expense of subsequent upgrade or replacement. Neither option is desirable.

The deregulation of the electric utility industry has created a larger need for electrical power measurement devices with a wide range of functionality. Additionally, as technology advances and consumers become more reliant on electricity for their business needs, the need for devices that perform more complex functions and contain more features, and thus circuitry, is imposed upon the manufacturers. To keep up with the deregulation, many consumers are required to replace and install new complex devices in existing cutouts or enclosures, and further these cutouts are often cut to pre-defined standard sizes. These standard enclosure or cutout sizes are often old as they have generally been in place for several years, if not several decades. Thus the rapidly advancing technology has had to conform to the older standards.

Previously hardware keys have been used to protect specific software programs running on a generic computing platform such as a Personal Computer. Typically these devices known as dongles, allowed the user full access or no access at all. When a dongle is attached to a generic computer, it does not control access or change the capabilities of the computer hardware. It is specifically concerned with controlling access to specific software program. Much of the functionality of dongles has been replicated and replaced in recent years by the use of floating network software licenses.

Furthermore, hardware keys or other types of dongles were solely utilized in conjunction with specific software programs with the express purpose of ensuring only those authorized to use or copy the software were doing so. Providing dongle based security is typically more expensive than other anti-piracy solutions, therefore dongles are typically reserved for more expensive software programs. Ensuring only authorized users are accessing these expensive programs is often a key motivator for the software companies. The use of hardware keys has been restricted to the field of adapting to a general piece of hardware or computer that the software is installed on, the computer or other hardware being generally available from multiple manufacturers in the marketplace.

BRIEF SUMMARY

A device accommodates multiple versions of the device by utilizing a generic or common version of the device that can be manufactured, stocked and installed and then customized with the addition of a feature key or key module. The device, or Intelligent Electronic Device ("IED"), could include programmable logic controllers, remote terminal units, protection relays, terminal blocks, fault recorders and electrical meters.

Allowing these devices to be generically manufactured can lower production, ordering and stocking related costs. Further, retailers can free up invested capital by purchasing several generic devices and customizing as the customer requires, in place of purchasing several pre-customized devices and run the risk of not having the specific device a consumer wants or not being able to sell stocked items. Additionally, the use of the feature key described may allow consumers to stock generic units and customize them as the installation requires. Furthermore, scalability of the device with the addition of feature modules is also allowed with the use of a feature key. These advantages may allow consumers to stock and install devices more cost effectively than before, as well as configure, upgrade and scale systems more easily.

As described, the hardware key, or feature key, is utilized to aid in lower ordering, production and other manufacturing related costs on both the consumer and production side. The use of the feature key allows a manufacturer to manufacture multiple generic fully functional devices and ship a device to a user with a feature key, that feature key dictating which functions are enabled and disabled on the device. Further, the use of a feature key allows for ease of module additions to a device. A customer may order several "base" models of a particular IED, along with feature keys and in the future, order additional physical modules with increased functionality which the base unit did not support. The addition of these new modules may prevent the customer from having to purchase and re-install an entirely new device when an upgrade is required.

In a preferred embodiment, module additions may contain features, functionality and additional hardware such as additional communications and advanced communications, wireless communications, analog input/outputs, digital input/outputs, data or energy logging features, Ethernet connections, communication protocol capabilities, such as Lonworks™ capabilities, or additional memory options. Further, modules have the capability of retrieving or generating data, or a combination of both. In an alternate embodiment both the device and the attached module contain processors capable of communicating and sharing data and functions. Where traditional multi-processor devices utilize one processor as a "master" processor to "pull" or "push" data between the module and the device, in a preferred embodiment the device allows a module to provide added functionality while utilizing the processors in both the device and the module.

Accordingly, the number of multiple devices that are required to be manufactured and stocked in inventory may be simplified and reduced by providing a device whose functionality can be easily reconfigured. Also, an improved device may be provided that can be scalable and upgradeable to conform to consumers needs while maintaining a competitive price structure.

DETAILED DESCRIPTION

Manufacturers often supply several versions of a particular device or product to meet different consumer needs. Often the base functionality of the device is the same but enhanced or added features may be included from one device model to another. An exemplary device may include the parent or "entry level" device including base functions such as communication functions, harmonic functions and other power measurement functions. An enhanced version offering features such as scheduling functions, arithmetic functions and increased sliding window demand functionality, or a further enhanced version, may include increased functionality such as waveform recording and sag/swell functionality.

To provide a device that can adapt to accommodate at least some of the features and functions described above, a preferred embodiment utilizes a hardware feature key, that includes a key module and a key code which, when installed on a "base" or "parent" device, configures the base device and allows the user to access and utilize various levels of features. For example, the base device includes the hardware and software functionality to provide many electrical measurements, communications and digital outputs. The hardware feature key controls whether or not any of these features or functions of the device is enabled.

Manufacturing one generic device can allow the manufacturer to decrease production related costs by manufacturing one device instead of multiple similar devices. An exemplary device is type 6200 manufactured by Power Measurement Ltd. located in Saanichton, B.C., Canada. In the exemplary device power management functions, such as voltage and current measurements, are provided on the "base" device, and additional functions, such as harmonics measurement, power factor, real power, reactive energy, apparent energy, reactive power, apparent power, frequency, current demand, voltage demand or other kWh or kW measurements are also provided. It can be appreciated that power management functions include both software calculations and the associated hardware required to perform the calculations, as described in more detail below.

Figure 1A:
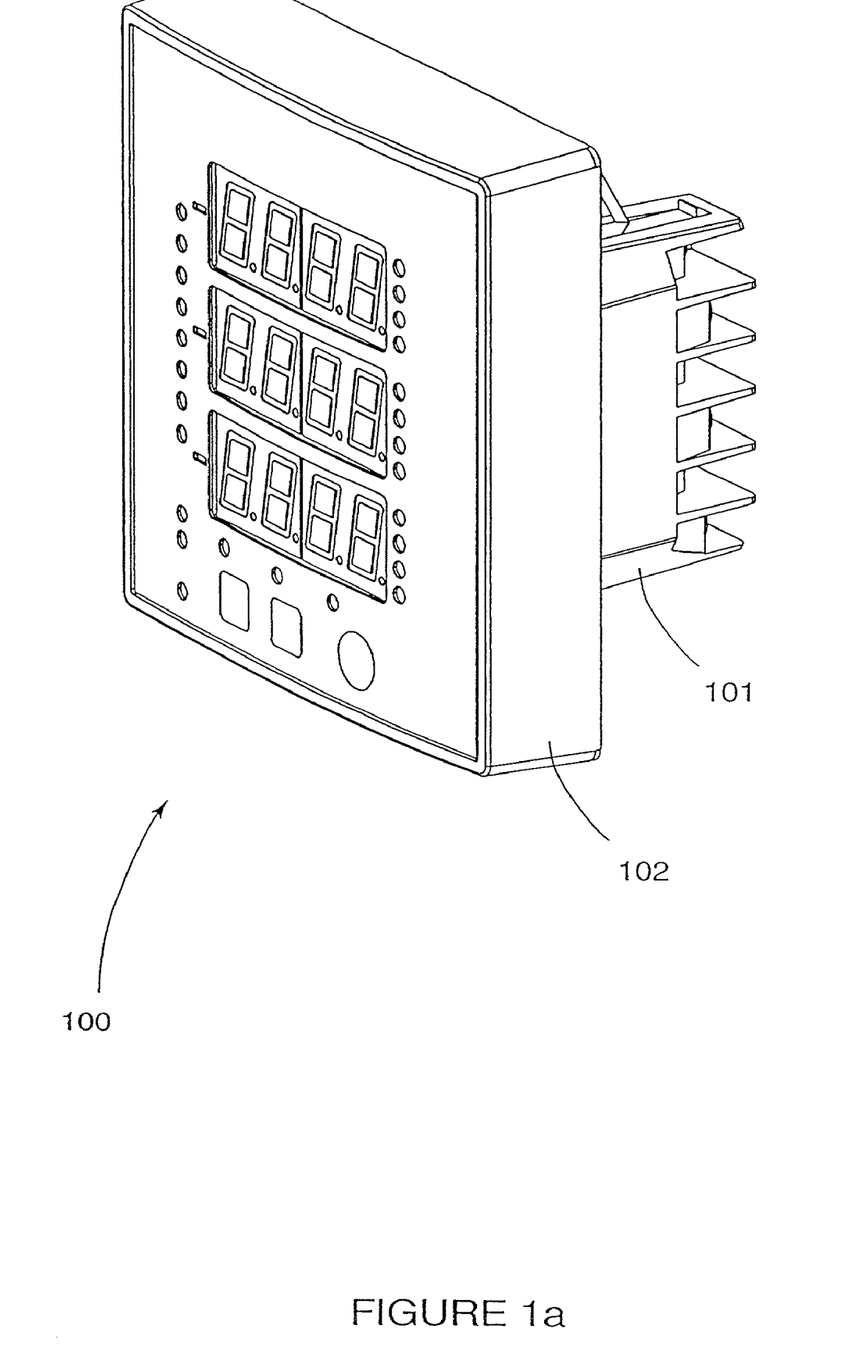
FIG. 1a illustrates a front perspective view of an exemplary device.
Figure 1B:
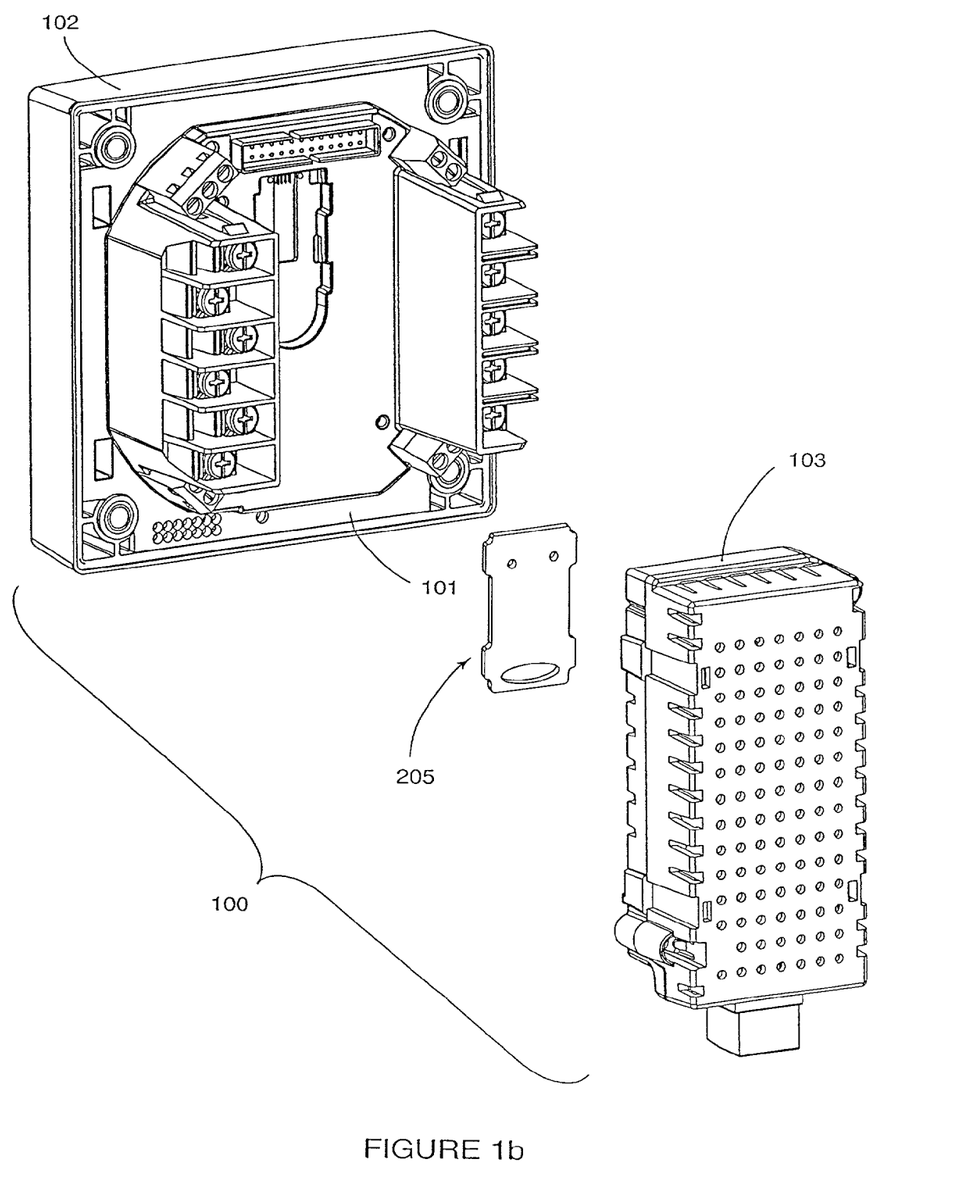
FIG. 1b illustrates a back perspective view of the exemplary device.

Referring now to the drawings, FIGS. 1a and 1b show front and back views of an exemplary device 100, respectively. The device 100 includes a base 101, a cover 102 and a power supply 103. A feature key 205, that includes a key module containing a key code, connects to the base 101. In FIG. 1b, the feature key 205 is received in the base 101 such that a first surface of the feature key 205 faces the base 101 and a second surface of the feature key 205 faces the cower supply 103. The feature key 205 may be sandwiched between the base 101 and the power supply 103.

Figure 2:
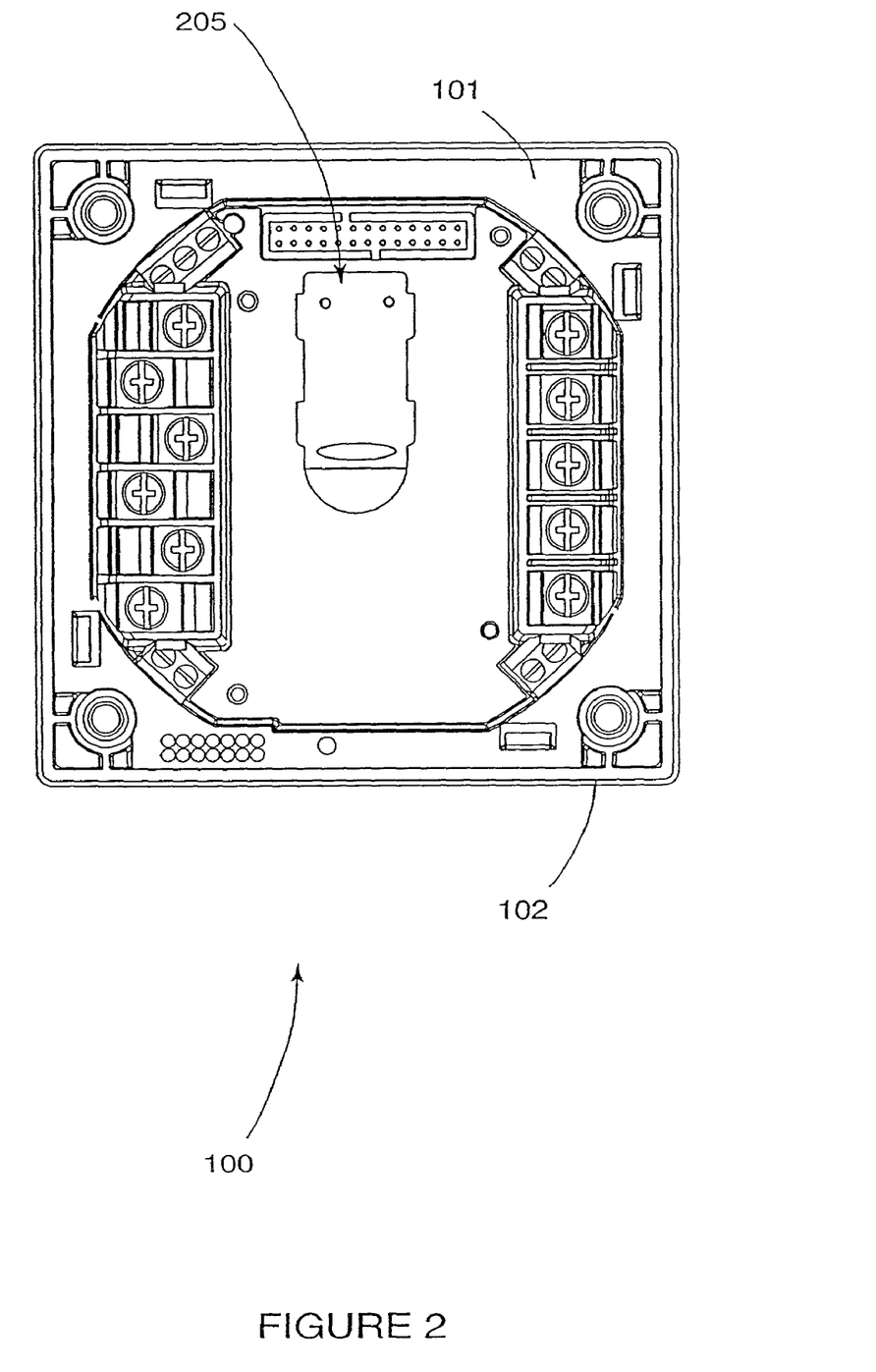
FIG. 2 illustrates a back view of the exemplary device.

FIG. 2 shows a back view of the device 100 with the power supply 103 removed for clarity. The feature key 205, including the key module and the key code, connects to the base 101 and, in a preferred embodiment, is not accessible when the power supply 103 is connected to the device 100. Requiring the removal of the power supply 103 ensures that a user, while using the device as intended, remove the power supply before removal of the feature key 205. Thus the user is prevented from removing the feature key 205 while the device is operating. This prevents a user from enabling the protected features and removing the key while the device is still powered.

In a preferred embodiment the feature key 205 includes a printed circuit board ("PCB") with circuitry placed on the PCB. The circuitry preferably contains a computer chip 310 (FIG. 3a) that is operative to aid in enabling and disabling various data registers, hardware and software features on the device. The computer chip is preferably a semiconductor chip with a one-wire connection to the chip in addition to ground. In operation a command is sent to the chip through the one wire connection, and the chip response is sent back along the same wire. An exemplary computer chip is type DS2432P, manufactured by Dallas Semiconductor, located in Dallas, Tex.

Figure 3A:
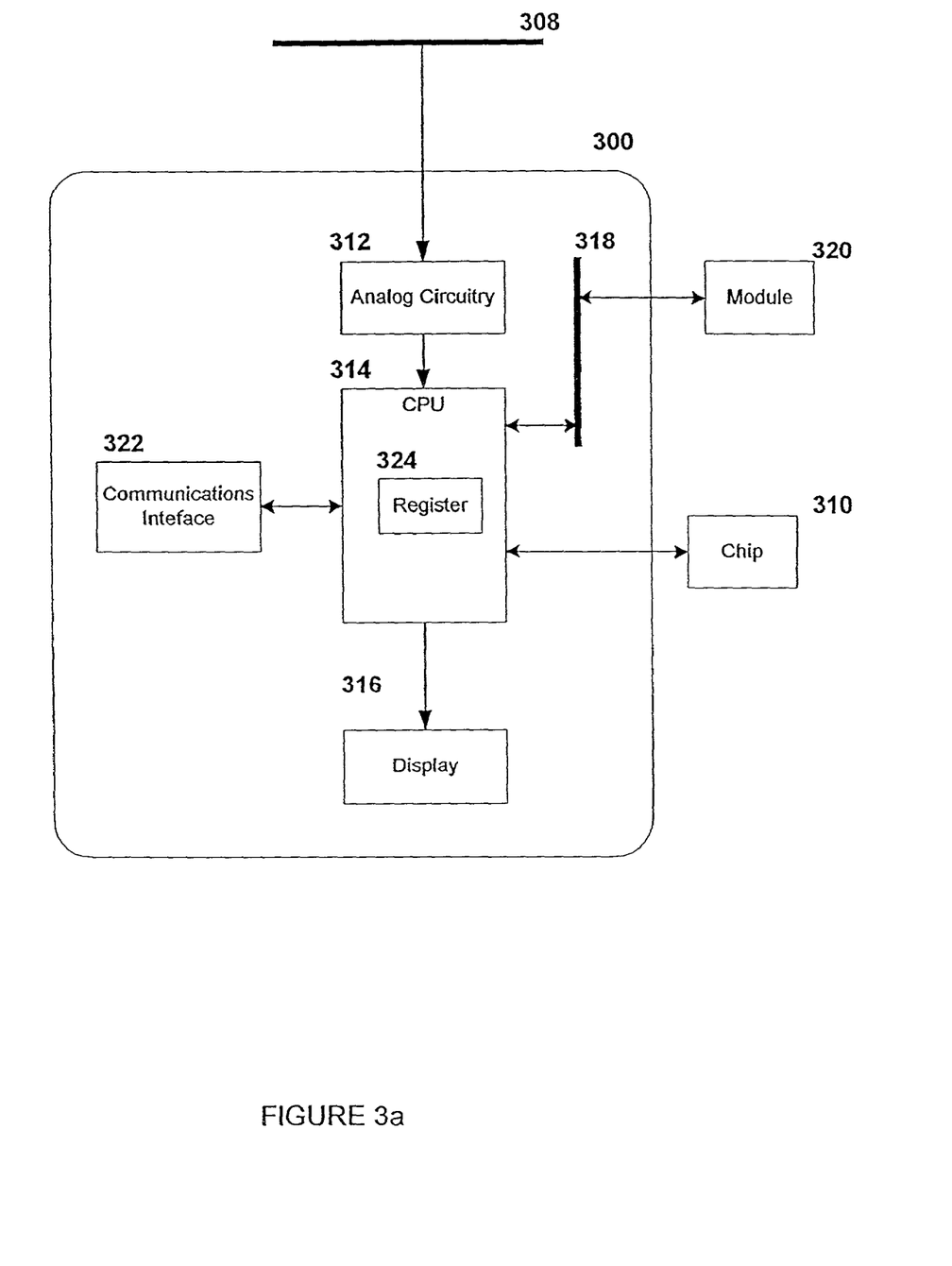
FIG. 3a shows a block diagram representation of the device

FIG. 3a illustrates the computer chip 310 as connected to an IED 300. In a preferred embodiment the IED 300 contains analog circuitry 312 connected to an electric circuit 308, a CPU 314 containing a set of registers 324, a display 316 and a communications interface 322 such as an RS485 port. A data Serial Peripheral Interface ("SPI™") bus 318 connects the CPU 314 and a function module 320 attached to the IED. The CPU further contains a Controller Area Network ("CAN") bus (not shown) which allows the device to communicate with a remote display. In operation the IED stores all data as measured from the analog circuitry 312 and calculated by the CPU 314 into at least one register 324. An exemplary CPU is the DSP56F803 from Motorola Inc., located in Schaumburg, Ill.

The use of the feature key 205 allows for protection of firmware stored in the device as the device will not operate without the feature key 205. Traditional IED's utilize flash memory which contains a "flash lock bit" which enables the manufacturer to load the IED firmware into the memory once, then disable the ability of a user to read the memory. This prohibits unauthorized users from reading and copying the firmware by accessing the CPU's external interface. The device is still enabled to read the memory and run the firmware because the firmware is stored internal to the CPU. An example of a chip containing a "flash lock bit" is the PIC16C67 microcontroller manufactured by Microchip Technologies located in Chandler, Ariz.

In a preferred embodiment the IED 300 is rendered inoperable without a feature key 205, thus preventing unauthorized users from operating the firmware without the key 205. This allows the manufacturer to reduce the need for memory which contains the "flash lock bit" and thus reduce the vulnerability of the firmware to piracy or copying by unauthorized individuals.

Figure 3B:
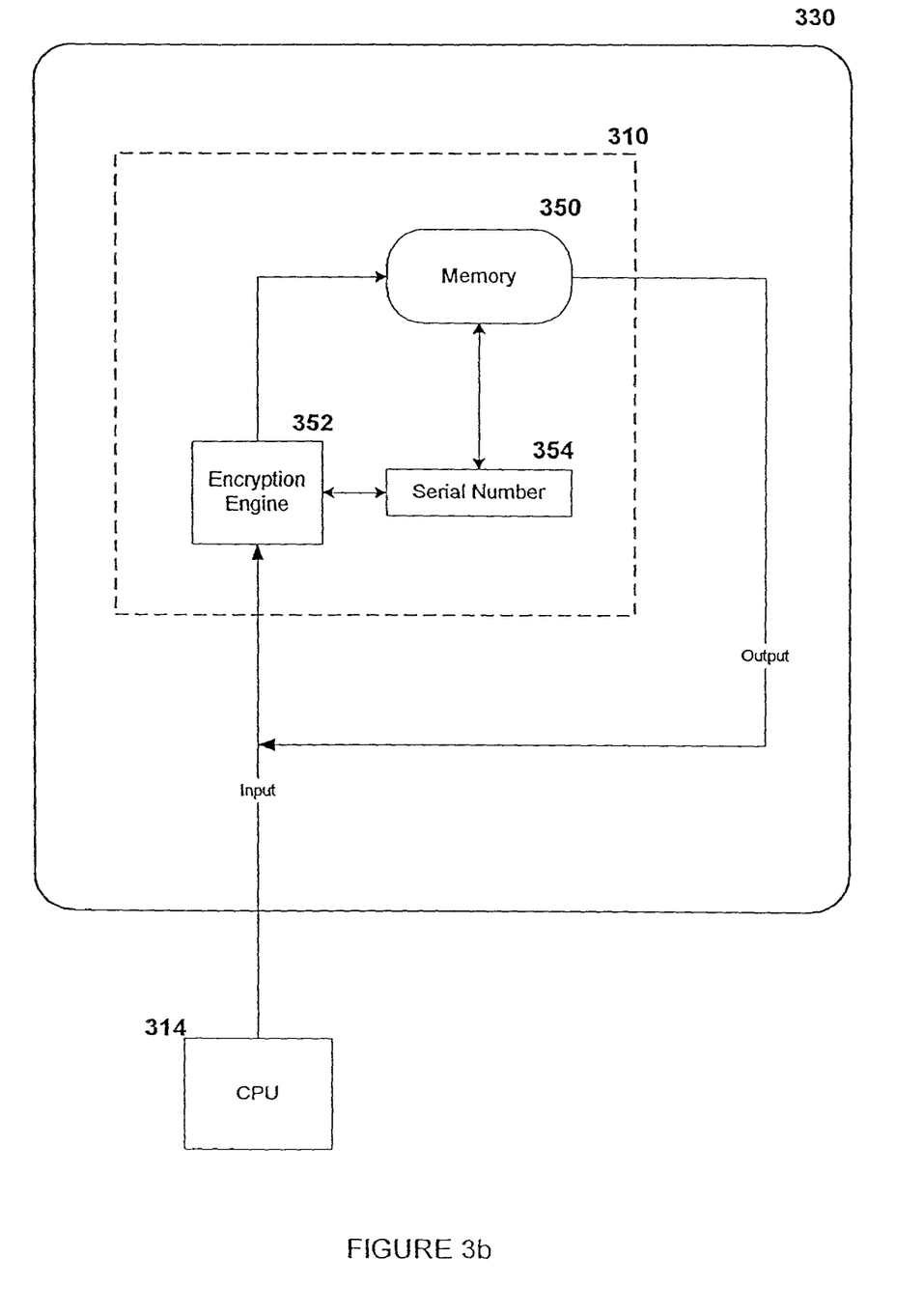
FIG. 3b illustrates a block diagram representation of the chip on the feature key.

As illustrated in FIG. 3b the computer chip 310, which is contained in the feature key's circuitry 330, contains an encryption algorithm engine 352, memory 350 and a unique 64-bit ROM serial number 354 which allows for unique identity. The chip also contains an 8-byte secret code which can preferably be written through the computer chip 310 interface but cannot be read. This 8-byte secret code is located in the memory 350. The combination of the unique serial number and the secret 8-byte code make the chip difficult to duplicate. In a preferred embodiment, an authentication code is created upon power-up of the device and compared to an authentication code on the chip. If the authentication does not match, the IED 300 is disabled. In one embodiment disabling the IED 300 will power down the device and in an alternate embodiment the IED 300 functionality is reduced to only minimal functions, such as displaying an error message or status report.

Figure 4:
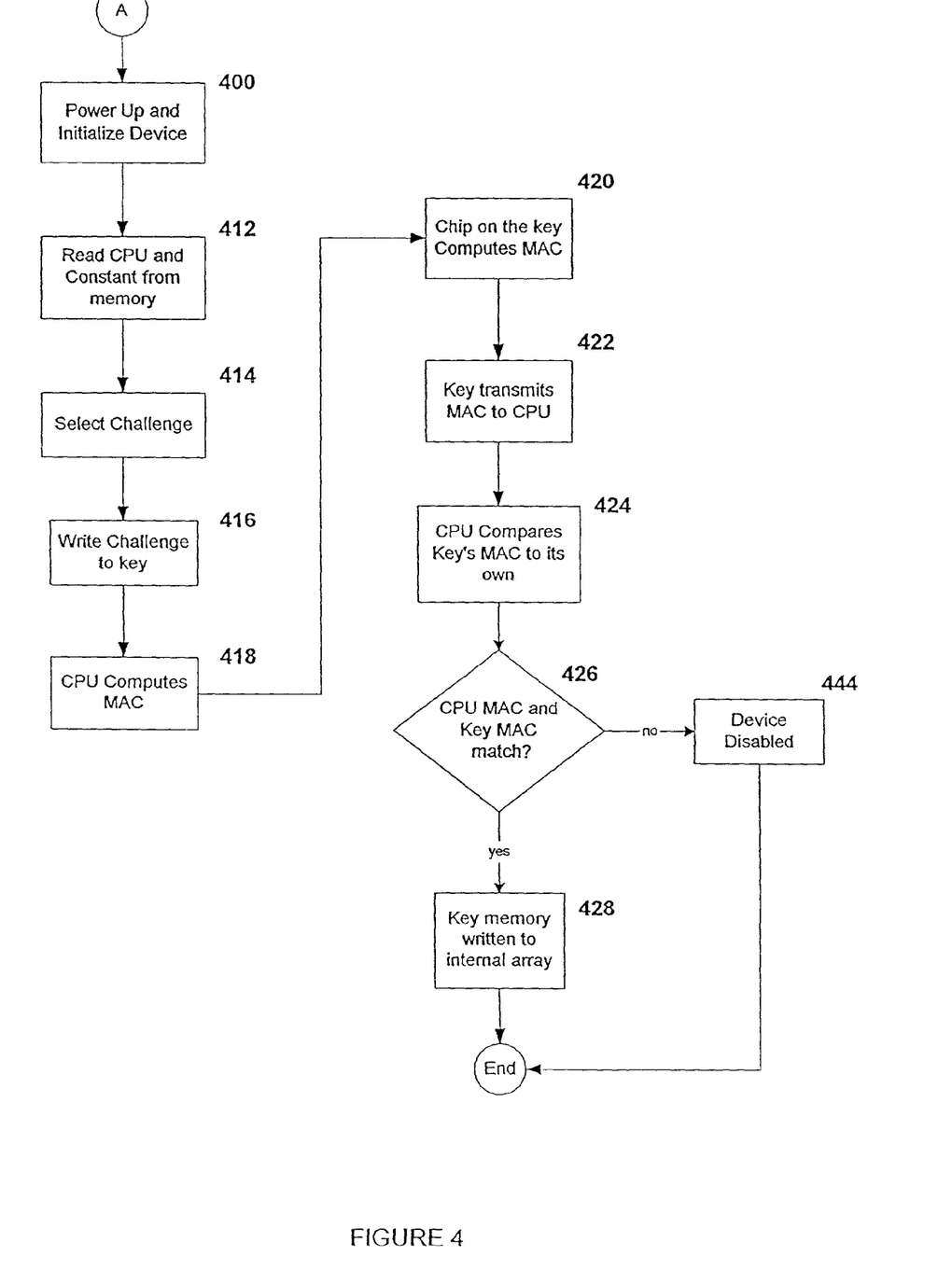
FIG. 4 is a flowchart representation of authenticating the feature key for a single processor.

FIG. 4 illustrates a way to authenticate the activation codes. At block 400, in operation, when the device 100 is first powered up, the chip data on the key is read into a data array in the CPU 314. Chip data includes the unique serial number of the chip, a memory pattern indicating the options that the feature key 205 enables and the family code in the chip 310. The family code specifies the communication requirements of the chip. The memory pattern is written into the computer chip 310 during manufacture of the feature key 205. During manufacture of the feature key 205 an additional secret memory pattern is written to the computer chip 310. This additional pattern cannot be read out of the computer chip 310 and is preferably only known to the manufacturer of the feature key 205. Further, the same secret memory pattern is also programmed into the IED 300 during manufacture.

The CPU 314 then copies the secret memory pattern and constant values required for operation of the chip from its internal non-volatile memory to additional locations in the data array, block 412. In a preferred embodiment the constant values are as required for operation of the chip as specified by the manufacturer. The CPU 314 selects a challenge, block 414, and writes the challenge to the feature key 205, block 416. The challenge is a 3-byte code utilized for additional security in authentication.

Both the CPU 314 and the computer chip 310 calculate a Message Authentication Code ("MAC") based on data in the computer chip 310, the secret, the challenge and the unique serial number, blocks 418 420. The MAC is preferably derived from the Secure Hash Standard SHA-1 which is published in the Federal Information Processing Standards Publication 180-1. The computer chip 310 on the key then transmits its result for the MAC to the CPU 314, block 422, and the CPU 314 compares the MAC received from the key with its own calculation, block 424. If the MAC's match, block 426, the memory pattern indicating the options that the key enables is written to an enabling arraying on the CPU 314, block 428, and operation of the IED 300 continues. Otherwise, if the MAC's do not match, operation of the device is disabled, block 444. In the preferred embodiment the chip operation, as described above, is done in accordance with the chip manufacturers specifications.

It will be appreciated that the memory pattern indicating the options that the key enables could also be encrypted using any of the methods known in the art, such as public or private key encryption. In addition, it will be appreciated that even greater security could be realized by randomizing the challenge each time the procedure is executed.

Figure 5:
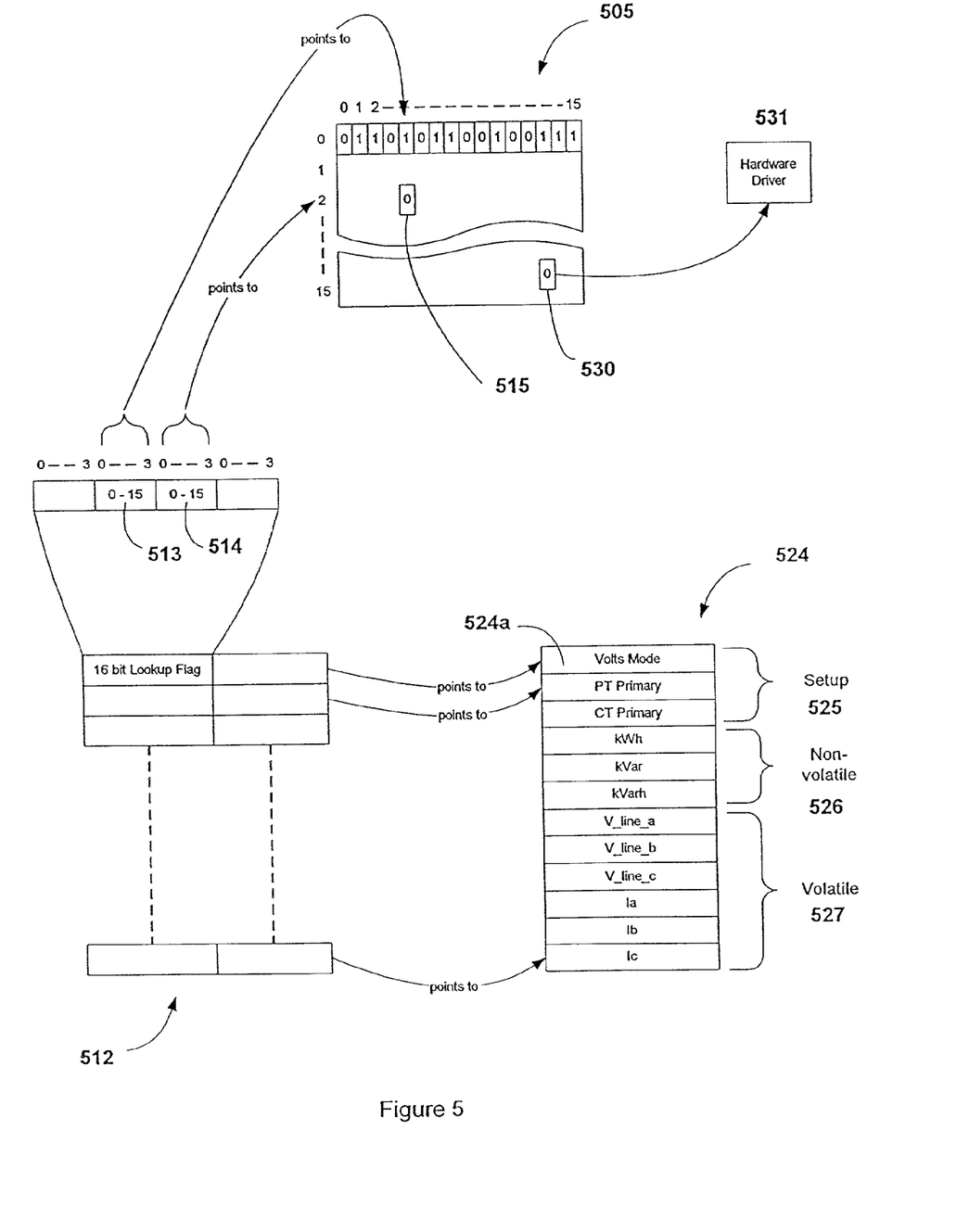
FIG. 5 illustrates an exemplary register according to preferred embodiments.

Referring to FIG. 5, registers 524 are illustrated that store data generated by the IED 300. A first register type 525 contains device configuration data, a second register type 526 contains non-volatile data and a third register type 527 contains volatile data. Preferably, the first register type 525 and second register type 526 sets of data have RAM locations and their contents are periodically backed-up to flash memory (not shown) and the third register type 527 set of data registers exist in RAM. The communications interface 322, as shown in FIG. 3a allows a user to read the registers 524 remotely and the display 316 allows the user to view the data contained in the registers. The computer chip 310 controls the ability to read the contents of a specific register.

Upon successful completion of the key verification sequence, a 256-bit bit-pattern is copied to a RAM location in the device known as the enabling array 505 that is organized in a 16-row by 16-column format. The enabling array 505 is part of the key code of the feature key 205. Those skilled in the art will appreciate that other formats for the enabling array could be used. A flag lookup table 512 contained in the firmware of the device contains a 32-bit field corresponding to each register. Eight of the 32 bits are dedicated to security of the specific register, the first four bits 513 of those eight bits point to the row index position in the enabling array and the latter four bits 514 point to the column index position in the enabling array 505. Based on the values present 515 in the enabling array 505, access to the register 524a is either permitted or denied.

For example, if the eight security bits on the lookup table 512 point to the fifth column 513 and the third row 514 of the enabling array 505, a cell position 515 containing '0' means that the register 524a corresponding to that 32 bit field is disabled. Attempts to access a disabled register can result in an error condition being returned. However, if the eight security bits on the lookup table 512 points to a position containing '1' in the enabling array 505, the register cell 524a is enabled and can be accessed. The security of access ('1') and no access ('0') is maintained in the enabling array 505. Those skilled in the art will appreciate that other values could be used to represent access and no access, such as access ('0') and no access (1'). The lookup table 512 is part of the device firmware and is associated with the same cell 515 in the enabling array 505. Changing or replacing the key 310 can be used to update the enabling array 505.

FIG. 5 also illustrates how the feature key 205 controls access to various hardware features. The hardware driver 531, a section of the firmware which controls the operation of a specific hardware function, is allocated an index position 530 in the enabling array. After power-up, each of the hardware drivers performs an initialization sequence to put the hardware in a known state, ready for operation. During the initialization sequence, the hardware driver checks its index position in the enabling array. As above, if the bit is zero, then the hardware is put into an inoperative state, if the bit is one, then the hardware is enabled for normal operation, or vise versa.

Figure 6:
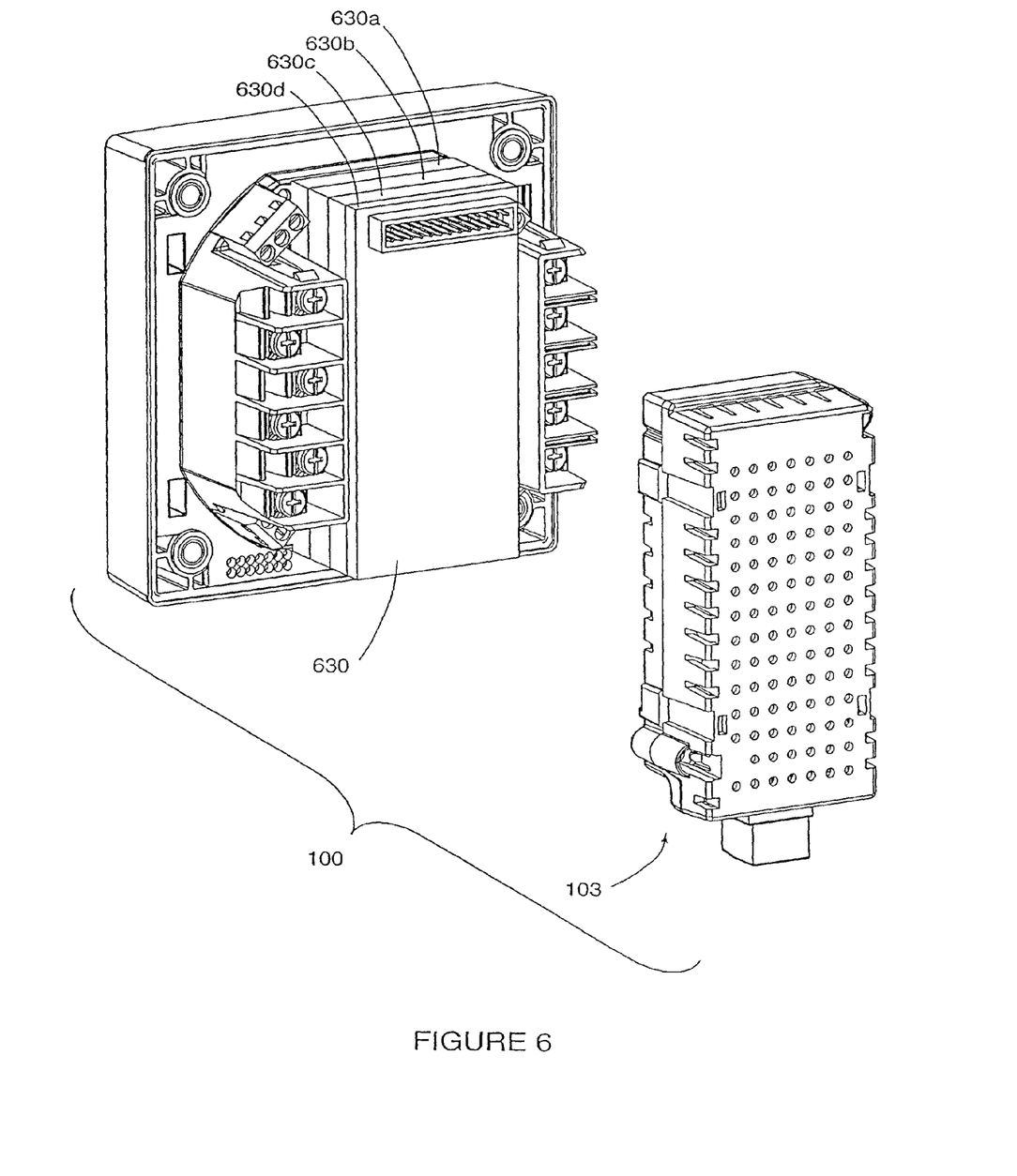
FIG. 6 illustrates a back perspective view of the exemplary device with attached modules.

Referring now to FIG. 6, a back view of the device 100 is shown with multiple external function modules 630a 630b 630c 630d attached to the device 100. A first external hardware function module 630a attaches to the device's base such that a feature key is sandwiched between the base and the first external hardware function module 630a. Additional external hardware function modules (e.g., 630b, 630c, and 630d) are attached one next to another such that a surface of an added external hardware function module contacts a surface of the immediately preceding external hardware function module. The external function modules 630 offer expandable features to the basic device. For example, modules may contain additional power management features, both hardware and software based, such as additional communications, advanced communications, wireless communications, analog inputs/outputs, digital inputs/outputs, data or energy logging features, Ethernet connections, communication protocol capabilities, such as Lonworks™ capabilities, additional memory options or processing power for measurement, analysis and control. Further, other communications and connections such as optical communications, wireless communications and various other types of telephony communications may be utilized by a module.

Modules typically have the capability of retrieving or generating data, or a combination of both. Of these features the software calculation based power management features may include data such as voltage and current measurements, harmonics measurement, power factor, real power, reactive energy, apparent energy, reactive power, apparent power, frequency, current demand, voltage demand or other kWh or kW measurements. Power management functions may include power measurement functions, such as measuring voltage and current, as well as power management functions, such as calculating power. Additionally, power management functions may be utilized to monitor and/or measure control power quality, protection, control or data logging on non-electrical parameters such as oil, gas, water, heat or steam.

In a preferred embodiment the enabling of the module functions is automatically done by default and in an alternate embodiment enabling the modules is done via the feature key 205. The use of a feature key 205 combined with added modules also allows the device to be easily upgraded in the field as a device can have a module or new feature key replaced or installed without taking the device out of service. In a preferred embodiment the modules are attached to a pass through connector which enables the power supply to be attached last. This pass through connector, e.g., containing the SPI™ bus 318, as shown in FIG. 3, connects the function modules 630 the power supply 103 and the main circuitry and CPU 314 on the device. In the preferred embodiment the communications between the power supply 103, external function modules 630 and the device circuitry is done using a custom protocol, however, it can be appreciated that a standard protocol, such as Peripheral Connect Interface (PCI) bus, VME bus or other protocols known in the art. It can be appreciated that the communications transfers can be both encrypted and unencrypted. Further, in the preferred embodiment the addition of extra function modules 630 requires the removal of the power supply 103, thus the user is prohibited from removing the feature key once the device has authenticated and enabled the hardware.

It can be appreciated that in certain situations only the feature key 205 need be upgraded to increase functionality of the device if the supporting hardware exists or alternately only modules need be added or upgraded if the feature key 205 supports the addition of this new hardware. For example, a customer orders a device with only the base functionality of monitoring voltage, current and power, but later wishes to upgrade the device to monitor energy data, such as kWh. Although the device already monitors and records energy data, the feature key 205 disables the access to the data as described above. The upgraded feature key 205 enhances the functionality of the device by providing access to kWh data without the replacement of measurement hardware or the replacement of firmware.

In an alternate embodiment the function modules 630a-d completely replace the authenticating and enabling hardware of the meter, by reading the feature key directly. This permits the addition of new modules that were not envisioned when the original meter was designed.

When function modules 630a-d are added to the base unit 101 the module may require read access or write access or both read and write access to the register set on the base unit. This is accomplished by transferring register values between the base unit and the module. This transfer requires that the module enforce the same security restrictions as those dictated by the security key on the base unit. The flag lookup table 512 is preferably included in the firmware of the module. In order to operate correctly, the module also has access to an enabling array to act in conjunction with the flag lookup table, as outlined above.

Figure 7:
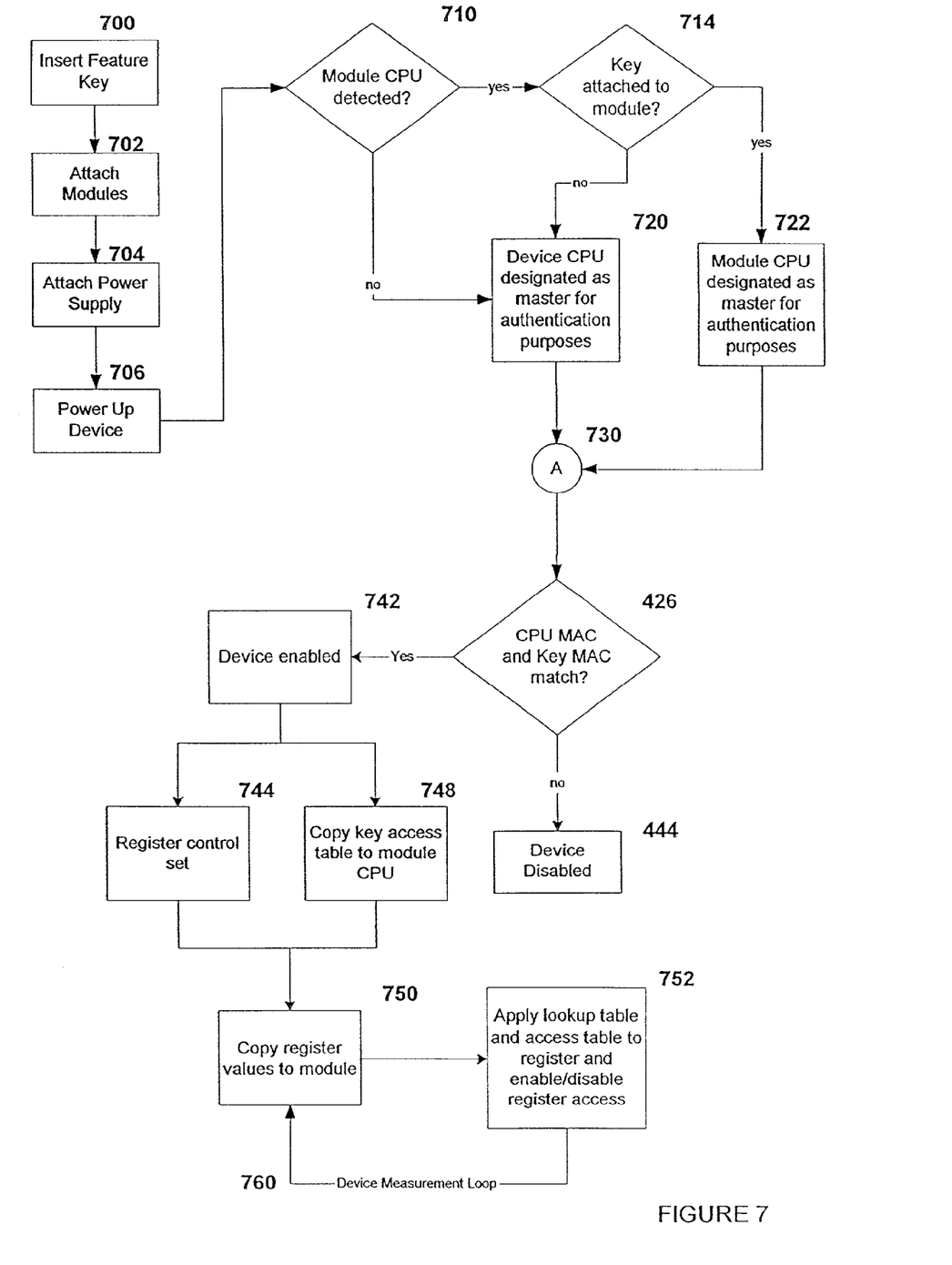
FIG. 7 is a flow chart representation of an alternate way to authenticate the feature key for multiple processors.

FIG. 7 is a flowchart illustrating the steps involved in authenticating the activation codes with added modules. In operation the power supply 103 is disconnected from the device and the feature key 205 is replaced with an upgraded feature key, block 700. In an alternate embodiment the module may have the ability to accept an additional key that overrides the original key attached to the device. This allows a user to install an upgraded module and associated key which embodies the features and functions not envisioned or supported in the original base device. In either case an upgraded or additional feature key allows for the addition of the module functionality to the device.

Once the feature key has been upgraded the modules 630 are connected to the device, block 702, and the power supply is connected 704. As illustrated in FIG. 3, the device, the power supply and the modules are all connected via a bus 318, thereby allowing data transfer between them. Upon initial power up of the device, block 706, the device checks the modules to see if an additional processor, the auxiliary processor, is provided with the module, block 710. If no auxiliary processor is detected, the processor on the base unit is used for authentication purposes, block 720.

If an auxiliary processor is detected in the attached module, the base unit 101 searches for a feature key 205 attached to the module, block 714. If a feature key 205 is found attached to the module, the auxiliary processor is designated as the master processor for authentication purposes, block 722. If no feature key 205 is found to be attached to the module, then the device processor is designated as the master processor for authentication purposes, block 720 and the feature key located on the device is utilized.

Again, allowing the module to contain an auxiliary processor allows the module to act either as an extension of the original base device, and the base device's associated CPU, or act as master CPU for the entire device. Further, the ability to add a module with a feature key 205 allows the user to override the device processor and original feature key embedded and attached to the original device. This allows for ease of upgrading a device, such as firmware or software upgrades, or adding future modules to perform calculations or functions which are too advanced for the device processor to handle. In an alternate embodiment the module CPU reads the feature key 205 directly performing the required authentication, as outlined earlier.

The master processor for authentication purposes then goes through the same procedure as outlined in FIG. 4 blocks 410-426 for the single processor case, block 730. As before, the device is disabled 444 or, in an alternate embodiment, the IED functionality is reduced to only minimal functions, such as displaying an error message or status report. If the device is enabled, block 742 the key memory is written to an internal array, and the register control is set, block 744. Also, the enabling array is copied from the authentication master device to the slave devices, block 748. Specifically, if the module is the master, the enabling array is copied to the device. If the main unit is the master, then the enabling array is copied to the module. Next the values in the data register measured by the device are copied to the module 750 and the access table and lookup table are applied to both the module register and the device register. As before, to enable or disable access to the data in the register the lookup table flag accesses the access table and returns a '0' or '1' based on the index location provided by the flag, and then disables or enables the access to the associated register's data 752. The register control allows the device and the module to maintain a coherent access policy.

The addition of modules to the device implies a multi-processor/multi-master architecture, since either the device or the module may wish to assert control over a specific register. In a preferred embodiment the default value is all register fields, unless specified, are controlled by the device CPU 314. The device and module constantly record and update data into the respective registers, or a specific register, and the registers are copied between the device and module 760. As described earlier, a master read/write control is set between the device and module registers to ensure the appropriate data is current.

It is to be understood that other changes and modifications to the embodiments described above will be apparent to those skilled in the art, and are contemplated. It is therefore intended that the foregoing detailed description be regarded as illustrative rather than limiting, and that it be understood that it is the following claims, including all equivalents, that are intended to define the spirit and scope of this invention.

The invention claimed is:

1. An intelligent electronic device ("IED"), the device comprising: a base; a cover connected with the base, wherein the base and the cover form an enclosure, the enclosure including an inside and an outside; an analog circuitry of the IED positioned in the inside of the enclosure; a hardware function module mounted to the enclosure, wherein the hardware function module performs a power management function in conjunction with the IED; a key code corresponding to the hardware function module, wherein the key code enables the hardware function module to operate; and a key module with the key code, wherein the key module is sandwiched between the enclosure and the hardware function module.

2. The device of claim 1, wherein the key code is encoded in a memory, the IED being adapted to maintain the key code in the memory.

3. The device of claim 1 wherein the hardware function module is removably mounted to the IED.

4. The device of claim 3 wherein the hardware function module is constructed and arranged to restrict access to the key module when the hardware function module is mounted to the IED.

5. The device of claim 3 further comprising a second hardware function module, wherein a surface of the second hardware function module contacts a surface of the first hardware function module.

6. The device of claim 5 wherein the second hardware function module is enabled by the key code.

7. The device of claim 1 further including an authentication means, the IED further comprising a memory wherein the key code is encoded in the memory.

8. The device of claim 7 wherein the key code is encoded in the key module, and where the key code in the memory and the key code in the key module are compared by the authentication means.

9. The device of claim 7 wherein the authentication means is operative to perform at least one of enable or disable the power management function.

10. The device of claim 9 wherein the authentication means is operative to perform at least of enable and disable the hardware function module.

11. The device of claim 7 wherein the authentication means is operative to perform at least one of enable and disable the IED.

12. The device of claim 1, wherein the IED is an electrical energy meter.

13. The device of claim 1 further including a CPU, the CPU comprising firmware, the hardware function module being operative to upgrade the firmware.

14. The device of claim 13, wherein the hardware function module is a temporary module that is removed after being used.

15. The device of claim 1 wherein the hardware function module contains of hardware and software based features.

16. In an intelligent electronic device ("IED") operative to perform a first power management function and a second power management function, the first power management function being disabled and the second power management function being enabled, the device comprising: a base; a cover connected with the base, wherein the base and the cover form an enclosure, the enclosure including an inside and an outside; an analog circuitry of the IED positioned in the inside of the enclosure; a key code to enable the second power management function; and a key module to maintain the key code, wherein the key code is maintained outside of the enclosure of the IED, the key module sandwiched between the enclosure and a power supply.

17. The device of claim 16, further including an authentication means, wherein the key code is encoded in a memory, the IED being adapted to maintain the key code in the memory.

18. The device of claim 16 wherein the key code is encrypted.

19. The device of claim 18 wherein the key code is encrypted in the memory.

20. The device of claim 16 wherein the IED is adapted to receive a function module, the function module further comprising at least a third power management function, where a first surface of the function module contacts the enclosure and a second surface of the function module contacts the power supply.

21. The device of claim 20 further wherein the function module further comprises hardware, the hardware operative to communicate with said IED.

22. The device of claim 20, further comprising a second function module, wherein the second function module is sandwiched between the first function module and the power supply.

23. The device of claim 16, the IED operative to perform a third power management function, the third power management function being enabled.

24. An intelligent electronic device ("IED") operative to perform at least one power management function, the power management function module being initially disabled, the device comprising: a base; a cover connected with the base, wherein the base and the cover form an enclosure, the enclosure including an inside and an outside; an analog circuitry of the IED positioned in the inside of the enclosure; a key module to enable the power management function; and an external hardware function module, wherein the key module is sandwiched between the enclosure and the external hardware function module.

25. The device of claim 24 wherein the external hardware function module operates to provide at least a second function.

26. The device of claim 25 wherein the external hardware function module is adapted to receive a second key module, the second key module operative to enable the power management function.

27. The device of claim 26 wherein the key module is removably mounted to the IED.

28. The device of claim 24 wherein the external hardware function module is adapted to receive a second key module, the second key module operative to enable the external function module.

29. The device of claim 28 wherein the second key module is removably mounted to the IED.

30. The device of claim 24 wherein the key module is removably mounted to the IED.

31. The device of claim 30 wherein when the key module is removed, the IED is disabled.

32. The device of claim 24 wherein the external hardware function module comprises hardware.

33. The device of claim 24 wherein the external hardware function module comprises firmware.

34. The device of claim 24 wherein the external hardware function module comprises wireless capabilities.

35. The device of claim 24 wherein the external hardware function module comprises additional memory capabilities.

36. The device of claim 24 wherein the external hardware function module comprises digital input and output capabilities.

37. The device of claim 24 wherein the external hardware function module comprises analog input and output capabilities.

38. The device of claim 24 wherein the external hardware function module comprises modem capabilities.

39. The device of claim 24 wherein the external hardware function module comprises Ethernet capabilities.

40. The device of claim 24 wherein the external hardware function module comprises additional power measurement capabilities.

41. The device of claim 24 wherein the external hardware function module comprises communication protocol capabilities.

42. The device of claim 24 further including an encryption algorithm engine to assist in preventing unauthorized access to the external hardware function module.

43. The device of claim 24 further comprising:
a first CPU connected with the IED;
a second CPU connected with the IED, the first CPU and the second CPU operative to communicate.

44. The device of claim 43 wherein the first CPU and the second CPU are operative to communicate with the key module, the key module operable to enable at the external hardware function module.

45. The device of claim 43 wherein the first CPU and the second CPU are operative to communicate with the key module, the key module operable to enable the power management function.

46. The device of claim 43, wherein the first CPU comprises a first register, the second CPU comprising a second register whereby the first register is readable from the second CPU and the second register is readable from the first CPU.

47. The device of claim 43, the first CPU comprising a first register, the second CPU comprising a second register whereby the first register is writeable from the second CPU and the second register is writeable from the first CPU.

48. The device of claim 24 wherein the external hardware function module contains hardware and software based features.

49. The device of claim 24, further comprising a second external hardware function module, wherein the first external hardware function module is sandwiched between the enclosure and the second external hardware function module.

* * * * *